United States Patent [19]
Coelho

[11] Patent Number: 5,930,390
[45] Date of Patent: Jul. 27, 1999

[54] ENCODING/DECODING SIGNALS USING A REMAP TABLE

[75] Inventor: Rohan G. F. Coelho, Portland, Oreg.

[73] Assignee: Intel Corporation, Santa Clara, Calif.

[21] Appl. No.: 08/627,933

[22] Filed: Mar. 28, 1996

[51] Int. Cl.[6] .................................................. G06K 9/00
[52] U.S. Cl. ............................................ 382/168; 382/232
[58] Field of Search .................................... 382/168, 166,
382/162, 232, 177, 229; 380/20, 10; 348/5.5,
43, 476, 400, 578, 472, 581, 585; 345/302,
328; 395/102

[56] References Cited

U.S. PATENT DOCUMENTS

| | | | |
|---|---|---|---|
| 4,610,025 | 9/1986 | Blum et al. ............................... | 382/177 |
| 5,103,306 | 4/1992 | Weiman et al. ......................... | 348/400 |
| 5,218,431 | 6/1993 | Gleicher et al. ......................... | 348/472 |
| 5,227,863 | 7/1993 | Bilbrey et al. ........................... | 348/578 |
| 5,321,750 | 6/1994 | Nadan ..................................... | 380/20 |
| 5,416,510 | 5/1995 | Lipton et al. ............................. | 348/43 |
| 5,727,080 | 3/1998 | Cox et al. ................................ | 382/168 |
| 5,768,481 | 6/1998 | Chan ....................................... | 395/102 |

*Primary Examiner*—Jose L. Couso
*Assistant Examiner*—Anh Hong Do
*Attorney, Agent, or Firm*—Duane, Morris & Heckscher LLP

[57] ABSTRACT

Statistics are generated for a set of signals, where each signal is represented by a palette index. A remap table is generated based on frequency of occurrence of each palette index in the set of signals. The remap table is applied to the palette indices to map the set of signals into a set of remapped values. An encoded bitstream is generated based on the remapped values. In a preferred embodiment, a differencing operation is applied to the remapped values to generate difference signals for the set of signals. Statistical encoding is applied to the difference signals to generate variable-length codes for the set of signals. The encoded bitstream is generated for the set of signals from the variable-length codes. The encoded bitstream is decoded by reversing the encode processing, using the remap table.

48 Claims, 11 Drawing Sheets

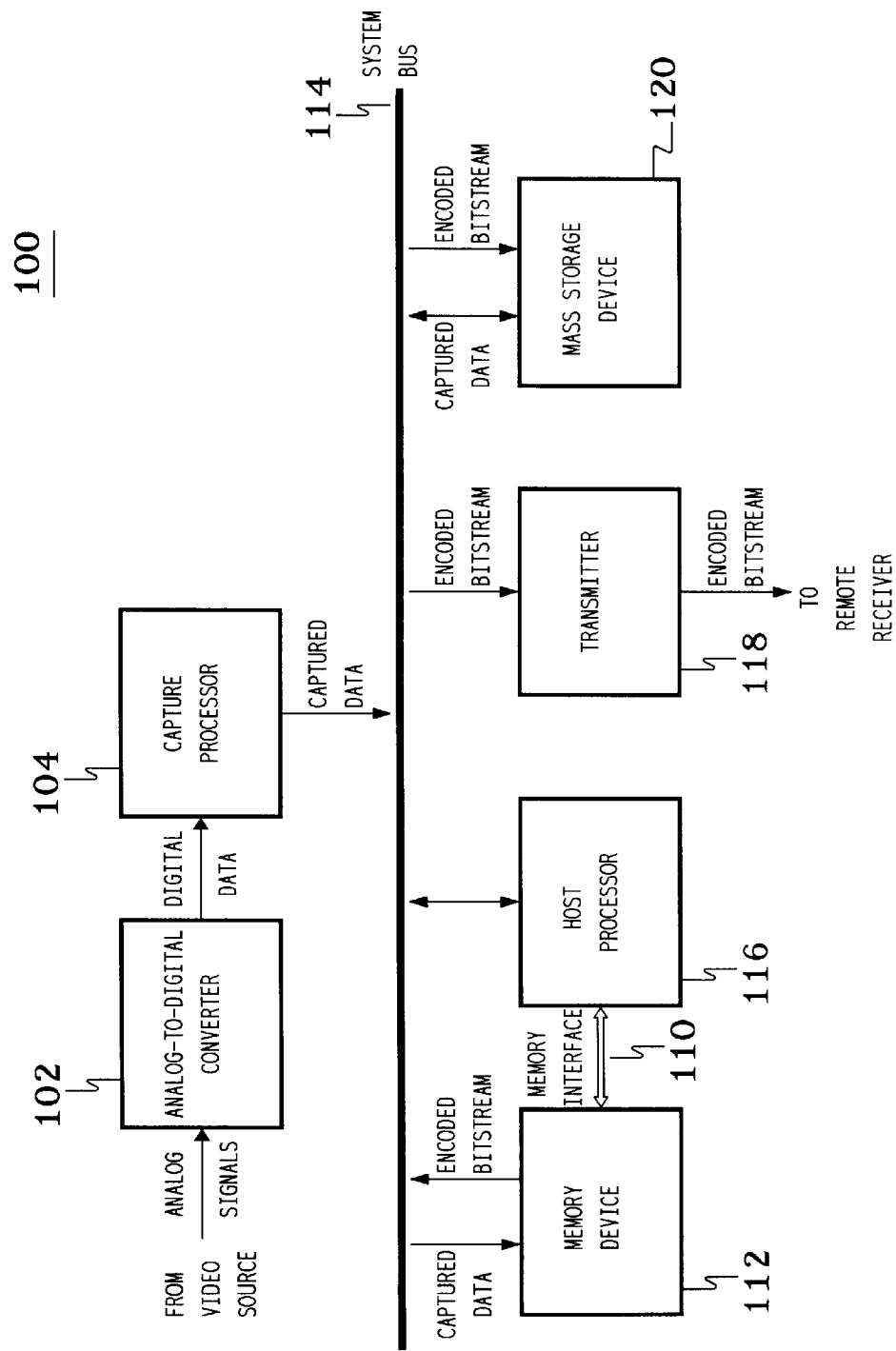
FIG. 1. ENCODING SYSTEM

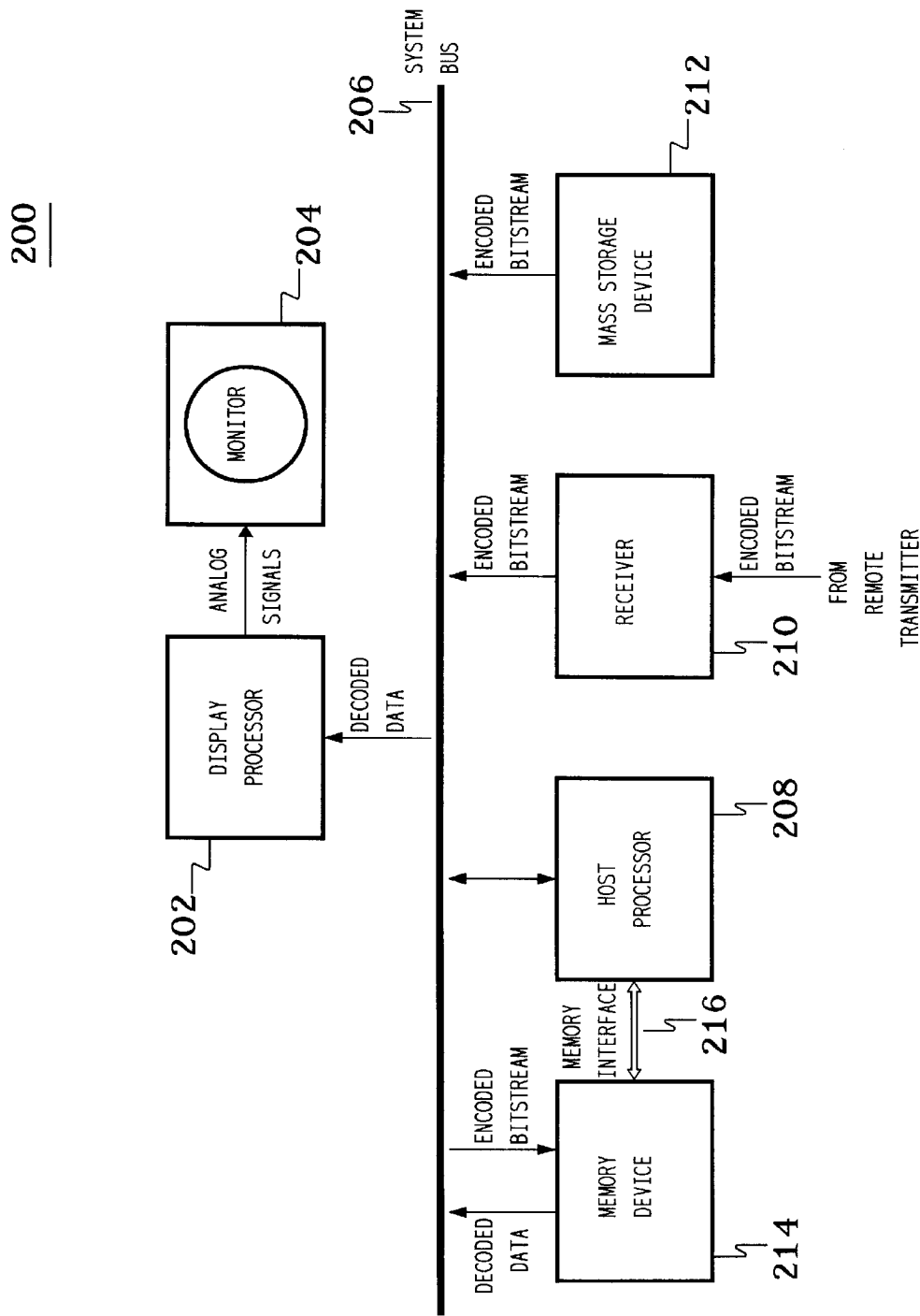
FIG. 2. DECODING SYSTEM

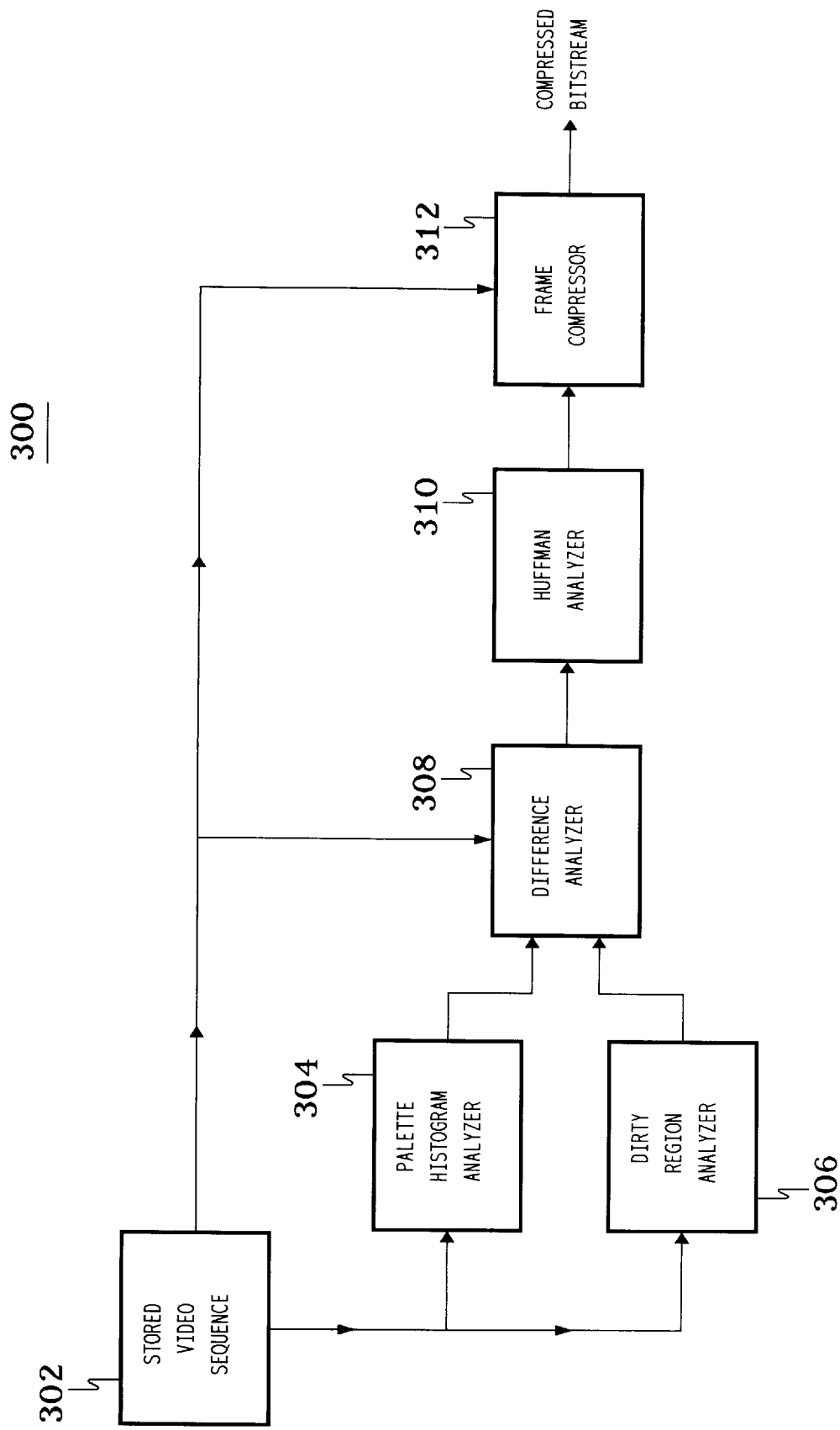
FIG. 3. VIDEO ENCODER

FIG. 4. INTRA BLOCK

|   | 0 | 1 | 2 | 3 |
|---|---|---|---|---|
| 0 | P(0,0) | P(0,1) | P(0,2) | P(0,3) |
| 1 | P(1,0) | P(1,1) | P(1,2) | P(1,3) |
| 2 | P(2,0) | P(2,1) | P(2,2) | P(2,3) |
| 3 | P(3,0) | P(3,1) | P(3,2) | P(3,3) |

FIG. 5. DIFFERENCE BLOCK

|   | 0 | 1 | 2 | 3 |
|---|---|---|---|---|
| 0 | $D(0,0) = P(0,0) - P(0,0)$ $[= 0]$ | $D(1,0) = P(1,0) - P(0,0)$ | $D(2,0) = P(2,0) - P(1,0)$ | $D(3,0) = P(3,0) - P(2,0)$ |
| 1 | $D(0,1) = P(0,1) - P(0,0)$ | $D(1,1) = P(1,1) - P(0,1)$ | $D(2,1) = P(2,1) - P(1,1)$ | $D(3,1) = P(3,1) - P(2,1)$ |
| 2 | $D(0,2) = P(0,2) - P(0,0)$ | $D(1,2) = P(1,2) - P(0,2)$ | $D(2,2) = P(2,2) - P(1,2)$ | $D(3,2) = P(3,2) - P(2,2)$ |
| 3 | $D(0,3) = P(0,3) - P(0,0)$ | $D(1,3) = P(1,3) - P(0,3)$ | $D(2,3) = P(2,3) - P(1,3)$ | $D(3,3) = P(3,3) - P(2,3)$ |

FIG. 6. DIFFERENCE BLOCK

|   | 0 | 1 | 2 | 3 |
|---|---|---|---|---|
| 0 | $D(0,0) = P(0,0) - A0$ | $D(1,0) = P(1,0) - P(0,0)$ | $D(2,0) = P(2,0) - P(1,0)$ | $D(3,0) = P(3,0) - P(2,0)$ |
| 1 | $D(0,1) = P(0,1) - A1$ | $D(1,1) = P(1,1) - P(0,1)$ | $D(2,1) = P(2,1) - P(1,1)$ | $D(3,1) = P(3,1) - P(2,1)$ |
| 2 | $D(0,2) = P(0,2) - A2$ | $D(1,2) = P(1,2) - P(0,2)$ | $D(2,2) = P(2,2) - P(1,2)$ | $D(3,2) = P(3,2) - P(2,2)$ |
| 3 | $D(0,3) = P(0,3) - A3$ | $D(1,3) = P(1,3) - P(0,3)$ | $D(2,3) = P(2,3) - P(1,3)$ | $D(3,3) = P(3,3) - P(2,3)$ |

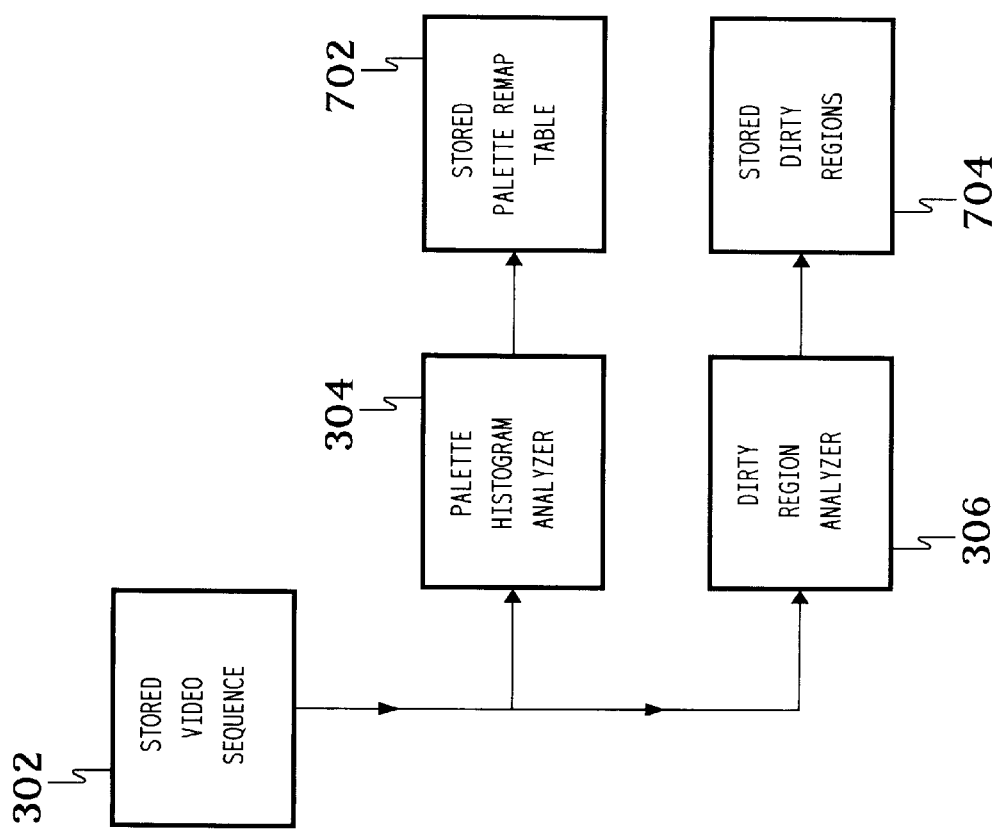
FIG. 7. FIRST PASS

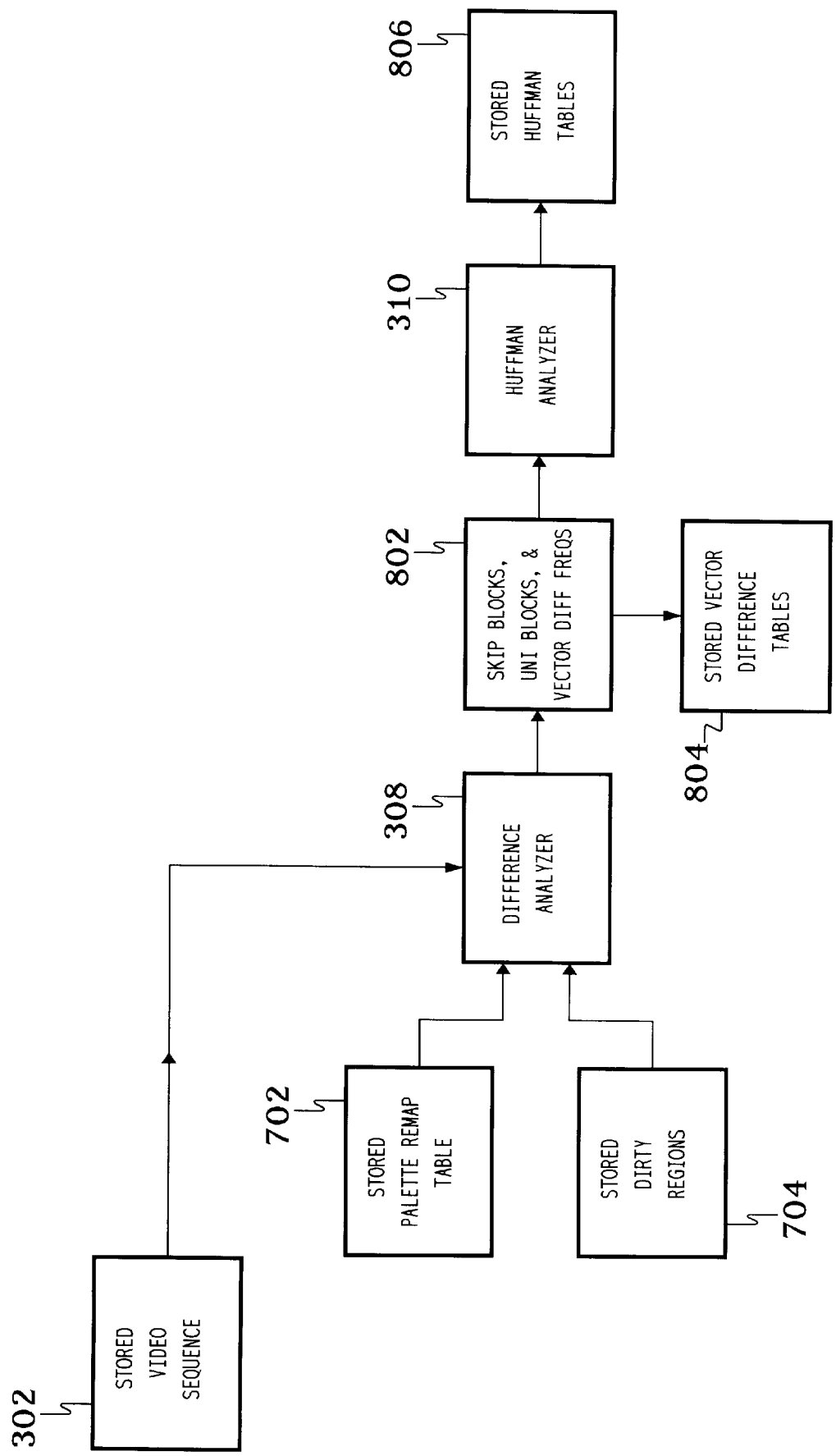
FIG. 8. SECOND PASS

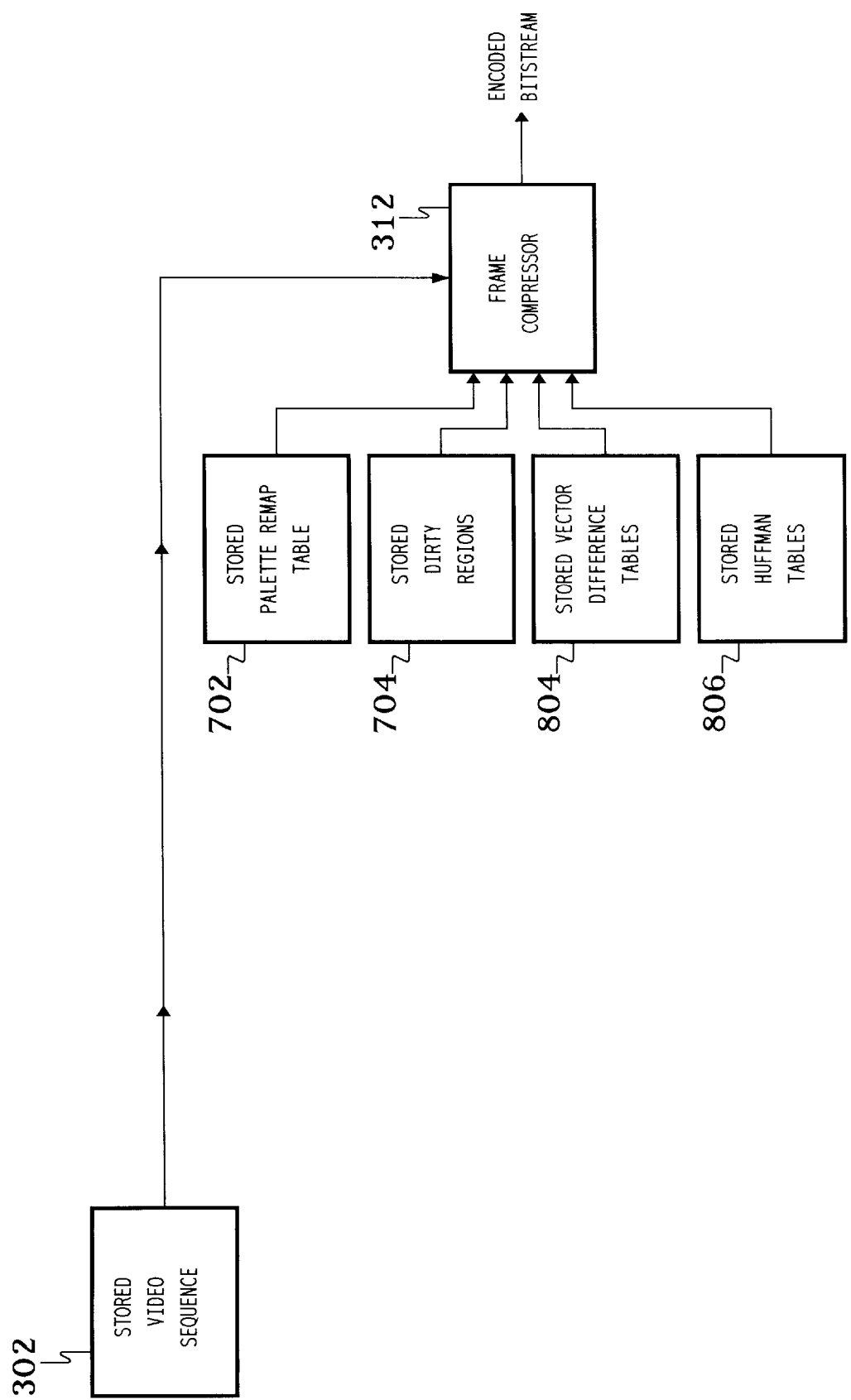
FIG. 9. THIRD PASS

FIG. 10. COMPRESSION PROCESSING
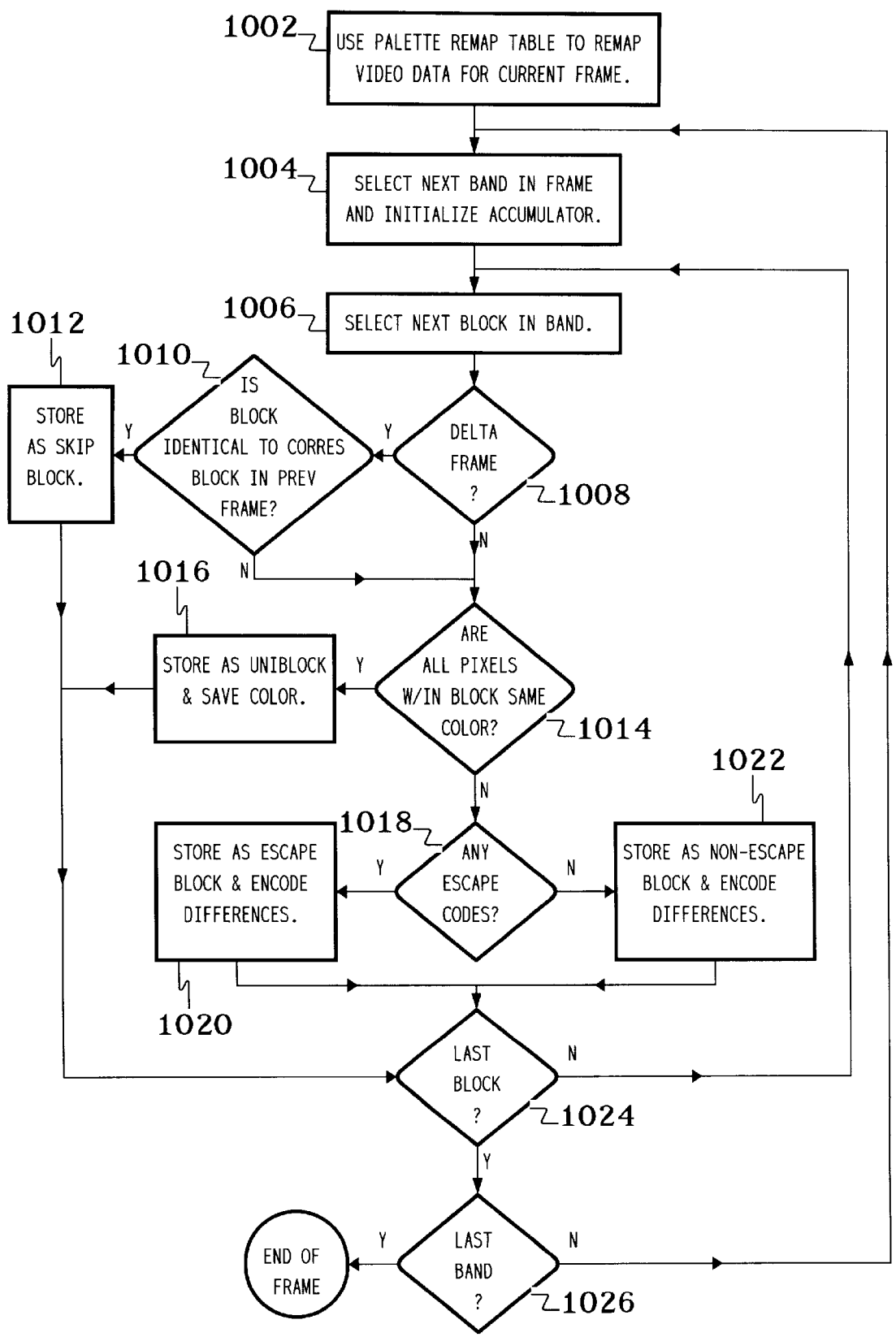

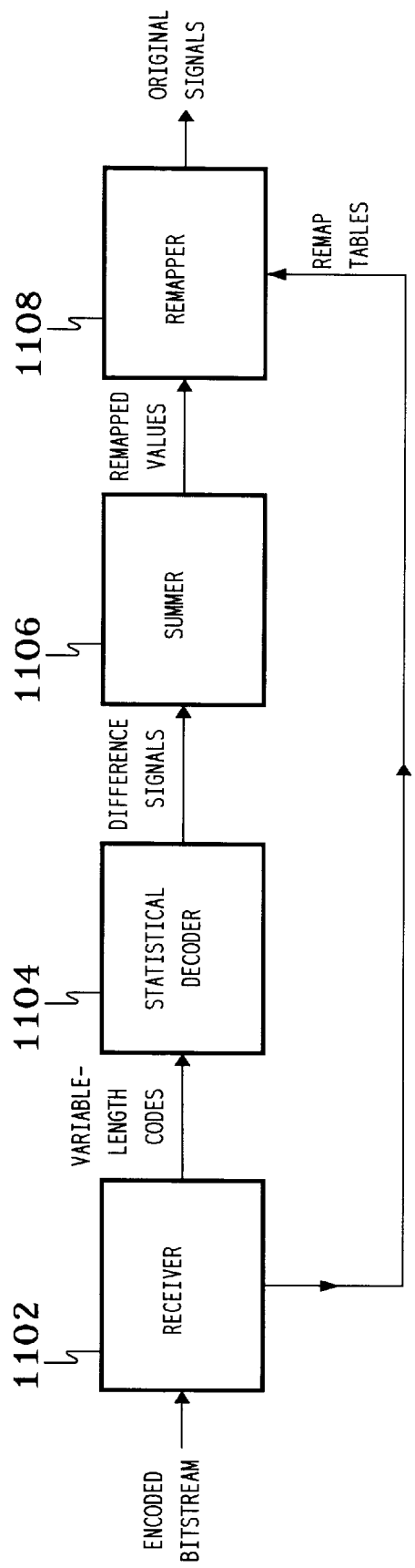
FIG. 11. VIDEO DECODER

ENCODING/DECODING SIGNALS USING A REMAP TABLE

BACKGROUND OF THE INVENTION

1. Field of the Invention

The present invention relates to signal processing, and, in particular, to the encoding of video data, especially sequences of palettized video images.

2. Description of the Related Art

In some image and graphics processing environments, the colors available for representing video images are limited to those defined in a color lookup table (CLUT) of limited size. For example, an 8-bit CLUT provides up to 256 different colors, each of which is identified by a CLUT index. The color lookup table maps each index value to a corresponding color represented in a different format, for example, 24-bit three-component RGB format. Video sequences that are represented by CLUT indices are called palettized video sequences. A palettized video sequence may be compressed into an encoded bitstream for transmission and/or storage for real-time and/or future decoding. After the encoded bitstream is decompressed, the color lookup table may be used to convert the decoded palettized video data to three-component data for display.

Unlike three-component video data which can be encoded using lossy compression schemes and still achieve acceptable quality during playback of the decoded video images, it is often desirable to encode palettized video streams losslessly to maintain satisfactory decode quality. The present invention relates to the encoding and decoding of palettized video data using a lossless compression scheme.

Further objects and advantages of this invention will become apparent from the detailed description of a preferred embodiment which follows.

SUMMARY OF THE INVENTION

The present invention comprises a computer-implemented process, an apparatus, and a storage medium encoded with machine-readable computer program code for encoding signals. According to a preferred embodiment, statistics are generated for a set of signals, where each signal is represented by an index. A remap table is generated based on frequency of occurrence of each index in the set of signals. The remap table is applied to the indices to map the set of signals into a set of remapped values. An encoded bitstream is generated for the set of signals based on the remapped values.

The present invention also comprises a computer-implemented process, an apparatus, and a storage medium encoded with machine-readable computer program code for decoding encoded video signals. According to a preferred embodiment, an encoded bitstream comprising codes is received, the codes having been generated based on remapped values, the remapped values having been generated by applying a remap table to an original set of signals, the remap table having been generated based on statistics of the original set of signals. The remap table is used to decode the encoded bitstream.

DESCRIPTION OF THE DRAWINGS

Other objects, features, and advantages of the present invention will become more fully apparent from the following detailed description of the preferred embodiment, the appended claims, and the accompanying drawings in which:

FIG. 1 is a block diagram of a video system for encoding video signals in a PC environment, according to a preferred embodiment of the present invention;

FIG. 2 is a computer system for decoding the video signals encoded by the computer system of FIG. 1, according to a preferred embodiment of the present invention;

FIG. 3 is a block diagram of a video encoder, according to a preferred embodiment of the present invention;

FIG. 4 is a representation of a (4×4) block of remapped pixel values P(i,j);

FIG. 5 is a representation of the pixel differencing scheme used to encode the block of FIG. 4, when the block of FIG. 4 is the left-most intra block in a band;

FIG. 6 is a representation of the pixel differencing scheme used to encode the block of FIG. 4, when the block of FIG. 4 is an intra block other than the left-most intra block in a band;

FIG. 7 is a representation of the processing applied by the video encoder of FIG. 3 during the first pass through the original video sequence;

FIG. 8 is a representation of the processing applied by the video encoder of FIG. 3 during the second pass through the original video sequence;

FIG. 9 is a representation of the processing applied by the video encoder of FIG. 3 during the third pass through the original video sequence;

FIG. 10 is a flow diagram of the compression processing implemented by the frame compressor of the video encoder of FIG. 3 to encode each frame of the original video sequence; and FIG. 11 is a block diagram of a video decoder, according to a preferred embodiment of the present invention.

DESCRIPTION OF THE PREFERRED EMBODIMENT(S)

The present invention relates to the encoding and decoding of video data, especially sequences of palettized video images. In a preferred embodiment of the present invention, palettized video data is compressed losslessly using a multi-pass encoding scheme.

System Hardware Architectures

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 24-bit RGB component data).

Capture processor 104 captures the digital 3-component video data received from converter 102. Capture processing preferably includes palettization of the video data (i.e., converting the 3-component data to 8-bit CLOUT indices) using a specified color lookup table. Capture processing may also include scaling of the video data to different pixel resolutions (i.e., different numbers of pixels per row and column of the images). Capture processor 104 stores the captured data to mass storage device 120 via system bus 114. Each video frame of captured data is represented by a two-dimensional bitmap of CLUT indices. The captured data will subsequently be retrieved from mass storage device 120 and stored in memory device 112 for encode processing by host processor 116. Those skilled in the art will understand that, in an alternative embodiment, the raw 3-component video data may be stored to mass storage device 120 and that palettization may be part of subsequent non-real-time processing.

During encoding, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the number of bits used to represent the information in the video images. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Referring now to FIG. 2, there is shown a computer system 200 for decoding the encoded video bitstream encoded by encoding system 100 of FIG. 1, according to a preferred embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data is scaled (optional) and color converted from palettized video data to three-component video data (e.g., RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In a preferred embodiment, A/D converter 102 and capture processor 104 are contained in a single plug-in board capable of being added to a microprocessor-based PC system. Alternatively, capture processing may be implemented by host processor 116, in which case there is no separate capture processor 104.

Host processor 116 may be any suitable means for controlling the operations of the special-purpose video processing board and for performing video encoding. Host processor 116 is preferably a general-purpose microprocessor manufactured by Intel Corporation, such as an i486®, Pentium®, or Pentium® Pro processor. System bus 114 may be any suitable digital signal transfer device and is preferably a peripheral component interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital data and is preferably a computer hard drive. Transmitter 118 may be any suitable means for transmitting digital data to a remote receiver. Those skilled in the art will understand that the encoded video bitstream may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding an encoded video bitstream and is preferably a general purpose microprocessor manufactured by Intel Corporation, such as an i486®, Pentium®, or Pentium® Pro processor. System bus 206 may be any suitable digital data transfer device and is preferably a PCI bus.

Mass storage device 212 may be any suitable means for storing digital data and is preferably a CD-ROM device or a hard drive. Receiver 210 may be any suitable means for receiving the digital data transmitted by transmitter 118 of encoding system 100. Display processor 202 and monitor 204 may be any suitable devices for processing and displaying video images (including the conversion of digital video data to analog video signals) and are preferably parts of a PC-based display system having a PCI graphics board and a 24-bit RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of the present invention, the video-encode processing of an encoding system and/or the video-decode processing of a decoding system may be assisted by a pixel processor or other suitable component(s) to off-load processing from the host processor by performing computationally intensive operations.

As shown in FIG. 1, the palettized video is generated from real-time video generated by a video source such as a camera. Those skilled in the art will understand that the palettized video of the present invention may come from alternative sources. For example, the palettized video may correspond to hand-generated animation sequences.

Software Architecture for Video Encoder

Referring now to FIG. 3, there is shown a block diagram of video encoder 300, according to a preferred embodiment of the present invention. Video encoder 300 encodes the palettized video captured by capture processor 104 of encoding system 100 of FIG. 1. Video encoder 300 is preferably implemented in software on host processor 116 of FIG. 1. Video encoder 300 comprises palette histogram analyzer 304, dirty region analyzer 306, difference analyzer 308, huffman analyzer 310, and frame compressor 312. Video encoder 300 encodes a sequence of palettized video frames stored in memory 302, which depending upon the size of the video sequence and the available storage capacities may be memory device 112 or mass storage device 120 of FIG. 1, or a combination of the two.

Video encoder 300 implements a multi-pass video compression scheme. That is, video encoder 300 applies two or more processing passes to the original palettized video sequence. With each pass, video encoder 300 generates data used in one or more subsequent passes. Nevertheless, each processing pass also uses the original palettized video sequence as input. In particular, video encoder 300 preferably applies three processing passes to the original palettized video sequence stored in memory 302. The multi-pass compression scheme is described in further detail later in this specification in the section entitled "Multi-Pass Video Compression."

Overview of Video Encoding Scheme

Video encoder 300 encodes palettized video using a particular encoding scheme. According to this scheme, each frame is encoded as either a key frame or delta frame. A key frame is encoded without reference to any other frames. A delta frame, on the other hand, is encoded with reference to another frame, which may be frame or another frame. In a preferred embodiment, each delta frame is encoded with reference to the immediately preceding frame in the video sequence.

Each frame, whether a key or a delta, is divided into one or more regions, where each region comprises one or more bands. Each band is a row of blocks, where each block is a (4×4) set of pixels. Note that a band may but does not have to start at the left edge of a frame, and may but does not have to stop at right edge of the frame (i.e., it may stop short of the right edge). Furthermore, the bands of a given region may vary in length from band to band. In alternative embodiments, the size of blocks may be other than (4×4).

In a delta frame, blocks are encoded as either skip blocks, uni blocks, or intra blocks. In a key frame, all blocks are encoded as either uni blocks or intra blocks; skip blocks are not allowed.

A skip block is one that is identical to the corresponding block of the previous frame. That is, each pixel (i.e., CLUT index) of the (4×4) skip block is identical to the corresponding pixel of the previous frame. A skip block can be efficiently encoded by representing the block in the bitstream by a special skip-block code. When a skip-block code is identified, a decoder can reconstruct the block by replicating the corresponding block of the previous frame.

A uni block is one that is not a skip block (that is, not identical to the corresponding block of the previous frame), but for which each pixel is represented by the same CLUT index. A uni block can be efficiently encoded by representing the block in the bitstream by a special uni-block code and its color. A (remap) value corresponding to the CLUT index for the uni-block color is variable-length encoded using a special uni-block huffman table. When a uni-block code and associated color are identified, a decoder can reconstruct the block by using the uni-block color for each pixel in the block.

An intra block is one that is neither a skip block nor a uni block. Intra blocks are encoded using a particular intraframe pixel differencing scheme (described below in conjunction with FIGS. 5 and 6). As will be described in further detail later in this specification in the section entitled "Generating a Palette Remap Table," the pixel values used in the intra-block pixel differencing scheme are not the CLUT indices of the original palettized video data; rather, the pixels are the remapped values that represent these CLUT indices. At the start of frame compression, the CLUT indices are remapped using the palette remap table.

Referring now to FIG. 4, there is shown a representation of a (4×4) block. The pixel values P(i,j) of FIG. 4 correspond to the remapped values for the original palettized video data.

Referring now to FIG. 5, there is shown a representation of the pixel differencing scheme used to encode the block of FIG. 4, when the block of FIG. 4 is the left-most intra block in a band. As shown in FIG. 5, the pixels in column 0 of the intra block are encoded based on differences with respect to pixel P(0,0). The pixels of columns 1, 2, and 3 are encoded based on differences with the pixels to the immediate left.

Referring now to FIG. 6, there shown a representation of the pixel differencing scheme used to encode the block of FIG. 4, when the block of FIG. 4 is an intra block other than the left-most intra block in a band. As shown in FIG. 6, the pixels in column 0 of the intra block are encoded based on differences with respect to the accumulator value Ai for each row. As described later in this specification with regard to FIG. 10, the accumulator holds the four current pixel values to be used for intra-block pixel differencing for the four rows of pixels in a band of blocks.

In general, for column 0 of the difference block of FIG. 6, the accumulator holds the pixel values from column 3 of the previous intra block. If, for example, the block immediately to the left of the block of FIG. 4 is a skip block and if the block to the immediate left of that skip block is an intra block, then the accumulator will hold the pixel values of column 3 of that previous intra block. The occurrence of a skip block does not affect the accumulator values.

Knowing the color of pixel P(0,0) of the left-most intra block and the differences D(i,j) of FIGS. 5 and 6, a decoder can reconstruct exactly the original intra blocks of a band. In one embodiment in which video encoder 300 is implemented on a serial processor, such as an Intel Pentium® processor, four pixel differences are generated at the same time in pseudo-SIMD fashion using the four 8-bit fields of 32-bit registers. Pseudo-SIMD processing is described in further detail in U.S. patent application Ser. No. 08/400,546, filed on Jan. 14, 1994 as attorney docket no. 366403-745W, U.S. Pat. No. 5,566 which is incorporated herein by reference.

The remapped value corresponding to the CLUT index for the color of pixel P(0,0) of the left-most intra block is preferably variable-length encoded using the same huffman table used to encode the uni-block colors. In alternative embodiments, a unique huffman table may be used for these remapped values.

The pixel differences D(i,j) are then further encoded as groups of differences called "vector differences." In a preferred embodiment, pairs of vertically adjacent differences are grouped together to form the vector differences. A vector-difference table is defined which maps a finite number of vector differences to a vector-difference code. If a particular vector difference is represented in the vector-difference table, then that vector difference can be represented more efficiently by a single vector-difference code. These codes are then variable-length encoded using a vector-difference-code huffman table.

If, however, a vector difference is not represented in the vector-difference table, then an escape sequence is constructed in which each difference is variable-length encoded using a single-value huffman table. In a preferred embodiment, the single-value huffman table used to encode each difference in such an escape sequence is the same as the huffman table used to encode the uni block colors.

Those skilled in the art will understand that the present invention may be implemented with different types of vector differences. In general, vector differences may be defined as horizontal, vertical, or even two-dimensional sets of two or more pixels.

Multi-Pass Video Compression

As mentioned earlier, video encoder 300 applies three processing passes to the original video sequence to generate a single encoded bitstream. These three passes are shown in FIGS. 7–9.

Referring now to FIG. 7, there is shown a representation of the processing applied by video encoder 300 during the first pass through the original video sequence. During the first pass, palette histogram analyzer 304 analyzes the entire video sequence from start to finish to generate a palette remap table 702 for use during subsequent processing passes. At the same time, dirty region analyzer analyzes the entire video sequence to identify the dirty regions 704 in each frame of the video sequence for use during subsequent processing passes. In one embodiment, the palette remap table 702 is generated using all of the data in the video sequence. In an alternative embodiment, the palette remap table 702 is generated using only the data in the dirty regions 704 of the video sequence. The definition of palette remap table 702 and a description of the processing of palette histogram analyzer 304 are presented later in this specification in the section entitled "Generating a Palette Remap Table." Similarly, the definition of dirty regions 704 and a description of the processing of dirty region analyzer 306 are presented later in this specification in the section entitled "Identifying Dirty Regions."

Referring now to FIG. 8, there is shown a representation of the processing applied by video encoder 300 during the second pass through the original video sequence. During the second pass, difference analyzer 308 uses the stored palette remap table 702 and the stored dirty regions 704 generated during the first pass to process the entire original video sequence 302 from start to finish a second time. Difference analyzer 308 identifies skip blocks and uni blocks in each frame and generates the frequencies of the different vector differences for the non-skip, non-uni blocks of each frame (802). This information is passed to huffman analyzer 310 which generates huffman tables 806 for the video sequence. Difference analyzer 308 also uses the frequencies of the different vector differences to generate one or more vector difference tables 804 of specified size. Difference analyzer 308 makes sure that the most frequently occurring vector differences are represented in the vector difference table, leaving the less frequently occurring vector difference to be encoded using escape sequences. The stored vector difference tables 804 are used during the third processing pass of FIG. 9. Descriptions of huffman tables 806 and the processing of huffman analyzer 310 are presented later in this specification in the section entitled "Generating Huffman Tables."

Referring now to FIG. 9, there is shown a representation of the processing applied by video encoder 300 during the third pass through the original video sequence. During the third pass, frame compressor 312 uses the stored palette remap table 702 and the stored dirty regions 704 generated during the first pass as well as the huffman tables 806 and vector difference tables 804 generated during the second pass to process the entire original video sequence 302 from start to finish a third time. Frame compressor 312 compresses the original video sequence 302 to generate an encoded bitstream shown in FIG. 1. A description of the processing of frame compressor 312 is presented later in this specification in the section entitled "Compression Processing." It will be understood that the processing results of the third pass are used to generate the encoded bitstream.

Generating a Palette Remap Table

The designer of a particular color lookup table (CLUT) used to represent palettized video images is free to select different three-component colors and assign those colors any of the available CLUT indices. As such, there may be little or no correlation from index to index as far as the corresponding colors are concerned. For example, the CLUT index value 17 may be used to represent a particular shade of orange, while the CLUT index value 18 may represent a shade of pink. At the same time, the CLUT index value 242 may represent a shade of orange only slightly different from the orange represented by CLUT index value 17. In such cases, the magnitudes of the differences between CLUT index values will not necessarily be indicative of the similarities between the corresponding colors. Put another way, just because two colors are similar doesn't mean that their CLUT index values will be close to one another. Moreover, two completely different colors may nevertheless have CLUT index values that are close together. As such, encoding palettized video sequences using standard pixel differencing schemes may prove inefficient, especially where lossless compression is desired.

According to a preferred embodiment of the present invention, palette histogram analyzer 304 of video encoder 300 of FIG. 3 generates a histogram of all of the CLUT index values for the entire video sequence. For each CLUT index, the corresponding histogram entry is incremented. The final histogram indicates the frequencies of occurrence of each different CLUT index value. Analyzer 304 uses that final histogram to generate the palette remap table 702 of FIG. 7. The palette remap table maps each CLUT index value to a unique remapped value. The purpose of the palette remap table is to map the CLUT index values of the original video sequence to remapped values that will provide more efficient encoding based on pixel differences.

Although it will be understood that different schemes may be employed to generate a palette remap table, in a preferred embodiment, palette remap table 702 is based on a bell curve or Gaussian distribution. For example, for 8-bit CLUT indices, palette remap table 702 is generated by mapping the most frequent CLUT index value as indicated by the histogram to the value in the middle of the remap table range (e.g., 128). The second most frequent CLUT index value is mapped to the value 127; the third most frequent value to the value 129; the fourth to 126; the fifth to 128, and so on until all of the different CLUT index values are assigned a different remapped value.

Using this palette remap table to remap the CLUT index values of the original video sequence to remapped values tends to make pixel differences (for intra blocks as described earlier with reference to FIGS. 5 and 6) smaller. Increasing the frequency of small pixel differences tends to make the number of different vector differences smaller. Decreasing the number of different vector differences increases the efficiency of variable-length encoding for those vector differences represented in the vector-difference Huffman table and decreasing the number of escapes for those vector differences that are not in the vector-difference Huffman table. As a result, encoding efficiency (i.e., compression ratio) is increased resulting in a smaller encoded bitstream.

The remap table is expressly encoded once into the encoded bitstream for the entire video sequence for use by the decoder in reconstructing the sequence. In a preferred embodiment, the definition of the remap table is included with the first frame of the video sequence. The remap table is defined in the bitstream simply by listing the remapped values in order (i.e., remapped value for palettized pixel value 0, followed by remapped value for palettized pixel value 1, and so on).

Identifying Dirty Regions

Dirty region analyzer 306 of video encoder 300 of FIG. 3 identifies dirty regions in each frame of the original video sequence during the first processing pass. A "dirty region" is any region containing one or more pixels that differ from the corresponding pixels of the previous frame. An encoder needs to encode only the dirty regions of each frame. If the encoded bitstream identifies the locations of the dirty regions, a decoder knows that the rest of the frame (i.e., the "clean regions" outside of the dirty regions) can be reconstructed simply by replicating the corresponding pixels from the previous frame. If dirty regions are defined to be rectangular in shape, then dirty regions can be identified in the encoded bitstream by, for example, the location of upper left corner and the height and width of the region.

Dirty regions are generated by performing a (4×4) block-by-block comparison between successive frames to identify those blocks of the current frame that have changed from the previous frame. Region analysis is then performed to identify rectangular regions of blocks to be grouped together as dirty regions. Those skilled in the art will understand that, depending upon the scheme used to identify the dirty regions in the encoded bitstream, it may be preferable to include otherwise clean regions as part of a dirty region in order to reduce the number of different dirty regions in a frame. For example, when an clean region (e.g., a skip block) is surrounded by dirty regions, it may be more efficient to include the clean region in a single large dirty region rather than separately define a number of different dirty regions just to exclude the clean region. Since a skip block is efficiently encoded using a single code, including the skip block in the dirty regions saves having to identify the location and dimensions of multiple dirty regions in the bitstream.

Generating Huffman Tables

Huffman analyzer 310 of video encoder 300 of FIG. 3 generates the Huffman tables used to encode the video data. In particular, Huffman analyzer 310 generates the uni-block-color Huffman table which maps the uni-block colors (actually the remapped values for the uni-block CLUT indices) to variable-length codes. Huffman analyzer 310 also generates the vector-difference Huffman table which maps a finite set of vector differences to variable-length codes.

In a preferred embodiment, Huffman analyzer 310 generates a histogram of the occurrences of the uni-block colors (including the occurrences of the colors of pixels P(0,0) of the intra blocks) for the entire video sequence as identified by difference analyzer 308 during the second processing pass of video encoder 300. Analyzer 310 then uses that histogram to generate a Huffman table that efficiently (if not optimally) encodes those colors. Similarly, analyzer 310 generates a histogram of the occurrences of the different vector differences generated by difference analyzer 308 during the second pass, and uses that histogram to generate the vector-difference Huffman table.

Compression Processing

Referring now to FIG. 10, there is shown a flow diagram of the compression processing implemented by frame compressor 312 of video encoder 300 to encode each frame of the original video sequence. Frame compressor 312 uses the palette remap table 702, the dirty regions 704, and the Huffman tables 806 generated during the first and second passes, to encode the frames of the original video sequence 302 during the third processing pass of video encoder 300.

In particular, the CLUT indices for the current frame are remapped using the palette remap table 702 (step 1002 of FIG. 10). When the current frame is divided into two or more bands, each band is processed in succession as controlled by steps 1004 and 1026. At the start of each band, the accumulator which holds the current values for intra-frame pixel differencing are initialized (step 1004). Steps 1006 and 1024 control the selection of blocks within each band.

If the current frame is a delta frame (step 1008), then the current block is tested to see if it is a skip block (i.e., is the current block identical to the corresponding block of the previous frame) (step 1010). If the current block is a skip block, then it is encoded as a skip block (step 1012) and processing continues to step 1024. If the current block is not a skip block or if the frame is a key frame (in which case, skip blocks are not allowed), then processing continues to step 1014, where the current block is tested to see if it is a uni block (i.e., all pixels in the current block having same color). If the current block is a uni block, then it is encoded as a uni block along with its color (step 1016) and processing continues to step 1024. If step 1014 determines that the current block is not a uni block, then it is an intra block and processing continues to step 1018.

If the current block contains any escape codes (i.e., one or more of the vector differences for the block is not represented in the vector-difference Huffman table) (step 1018), then the block is identified as an escape block and those vector differences that require escapes are explicitly encoded in escape sequences (step 1020). Otherwise, all of the vector differences for the block are represented in the vector-difference Huffman table and the block therefore has no escape codes. In that case, the block is identified as a non-escape block and all of the vector differences are encoded using the vector-difference Huffman table (step 1022). Identifying whether a block has any escape codes or not is done to optimize decoding efficiency. If the decoder knows that the current block has no escape codes, then it can decode the block without having to check to see whether each code is an escape code that warrants processing via an escape sequence. Such block decoding is more efficient that having to test each code before decoding.

The processing of FIG. 10 is repeated for each frame of the original video sequence to generate the encoded bitstream.

Software Architecture for Video Decoder

Referring now to FIG. 11, there is shown a block diagram of video decoder 1100, according to a preferred embodiment of the present invention. Video decoder 1100 decodes the encoded bitstream generated by video encoder 300 of FIG. 3. Video decoder 1100 is preferably implemented in software on host processor 208 of FIG. 2. Video encoder 1100 comprises receiver 1102, statistical decoder 1104, summer 1106, and remapper 1108.

Receiver 1102 receives the encoded bitstream and retrieves from it the variable-length codes and the remap table. Statistical decoder 1104 applies statistical decoding to the variable-length codes to retrieve difference signals (i.e, vector differences). Summer 1106 applies summing operations to convert the difference signals back to the remapped values. Remapper 1108 uses the remap table retrieved from the bitstream to remap the remapped values back to the original pixel signals of the palettized video. Alternatively, the video decoding system may combine the remap table with the palette-to-RGB table (i.e., the CLUT table) to generate a new table that maps from remapped values directly to RGB values, thereby eliminating the intermediate step of reconstructing the original palette indices.

Those skilled in the art will understand that, in a preferred embodiment, the encoding and decoding systems of FIGS. 3 and 11 provide lossless encoding and decoding of the palettized video signals.

Alternative Embodiments

Those skilled in the art will understand that the descriptions provided earlier were directed to specific embodiments of the present invention and the present invention also covers alternative embodiments. For example, alternative embodiments of the present invention may be used to encode non-palettized video images, such as three-component RGB, YUV, or YIQ data. In addition, the present invention may be embodied in video encoders that rely on lossy compression schemes for either palettized on non-palettized video.

It will also be understood that the video sequences encoded using the present invention may include anything from a single video frame (or even part of a single frame) up to an arbitrarily large number of frames. Moreover, the present invention may be used to encode each video sequence of a number of video sequences contained in a single video stream, where each video sequence represents a fixed number of frames or where each video sequence corresponds to a scene containing similar video frames.

The embodiment of video encoder 300 of FIG. 3 has three processing passes. In an alternative embodiment, a fourth pass is added in which statistics are generated on the escape sequences over the entire video sequence and used to generate a huffman table for variable-length encoding of the escape sequence values.

In a preferred embodiment, the palette indices are mapped to remapped values which are then subject to pixel differencing. Those skilled in the art will understand that remapping the palette indices may be implemented in encoding schemes that do not rely on pixel differencing. For example, it may be advantageous to remap the palette indices prior to applying a transform (e.g., a block transform) to the image data. In such a case, the palette indices may be remapped prior to applying the block transform.

In the examples presented above, the present invention was explained in the context of encoding video and other image signals. Those skilled in the art will understand that the present invention can be used in other processing that relies on signal differencing to represent signals that are representative of or constituting physical activity or objects. For example, audio signals can be encoded using signal differencing under the present invention.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A process for encoding signals, comprising the steps of:
   (a) generating frequency of occurrence statistics for a set of signals, where each signal is represented by an index;
   (b) generating a remap table based on the frequency of occurrence statistics of each index, wherein the remap table is generated by assigning the index with the highest frequency of occurrence to a remapped value near the middle of the range of the remapped values and by assigning indices with decreasing frequency of occurrence to the remapped values on either side of the remapped value corresponding to the highest frequency index in an alternating fashion;
   (c) applying the remap table to the indices to map the set of signals into a set of remapped values; and
   (d) generating an encoded bitstream for the set of signals based on the remapped values.

2. The process of claim 1, wherein the signals are video signals and the indices are palette indices.

3. The process of claim 1, wherein the remap table increases the probability that differences between the remapped values will be smaller for indices that occur more frequently.

4. The process of claim 1, wherein the remap table increases the probability that smaller difference values will occur more frequently.

5. The process of claim 1, wherein the remap table is encoded in the encoded bitstream.

6. The process of claim 1, wherein step (d) comprises the steps of:
   (1) applying a differencing operation to the remapped values to generate difference signals for the set of signals;
   (2) applying statistical encoding to the difference signals to generate variable-length codes for the set of signals; and
   (3) generating the encoded bitstream for the set of signals from the variable-length codes.

7. An apparatus for encoding signals, comprising:
   (a) means for generating frequency of occurrence statistics for a set of signals, where each signal is represented by an index;
   (b) means for generating a remap table based an the frequency of occurrence statistics of each index, wherein the remap table is generated by assigning the index with the highest frequency of occurrence to a remapped value near the middle of the range of the remapped values and by assigning indices with decreasing frequency of occurrence to the remapped values on either side of the remapped value corresponding to the highest frequency index in an alternating fashion;
   (c) means for applying the remap table to the indices to map the set of signals into a set of remapped values; and
   means for generating an encoded bitstream for the set of signals based on the remapped values.

8. The apparatus of claim 7, wherein the signals are video signals and the indices are palette indices.

9. The apparatus of claim 7, wherein the remap table increases the probability that differences between the remapped values will be smaller for indices that occur more frequently.

10. The apparatus of claim 7, wherein the remap table increases the probability that smaller difference values will occur more frequently.

11. The apparatus of claim 7, wherein the remap table is encoded in the encoded bitstream.

12. The apparatus of claim 7, wherein means (d):
(1) applies a differencing operation to the remapped values to generate difference signals for the set of signals;
(2) applies statistical encoding to the difference signals to generate variable-length codes for the set of signals; and
(3) generates the encoded bitstream for the set of signals from the variable-length codes.

13. A storage medium encoded with machine-readable computer program code for encoding signals, comprising:
(a) means for causing a computer to generate frequency of occurrence statistics for a set of signals, where each signal is represented by an index;
(b) means for causing the computer to generate a remap table based on the frequency of occurrence statistics of each index, wherein the remap table is generated by assigning the index with the highest frequency of occurrence to a remapped value near the middle of the range of the remapped values and by assigning indices with decreasing frequency of occurrence to the remapped values on either side of the remapped value corresponding to the highest frequency index in an alternating fashion;
(c) means for causing the computer to apply the remap table to the indices to map the set of signals into a set of remapped values; and
(d) means for causing the computer to generate an encoded bitstream for the set of signals based on the remapped values.

14. The storage medium of claim 13, wherein the signals are video signals and the indices are palette indices.

15. The storage medium of claim 13, wherein the remap table increases the probability that differences between the remapped values will be smaller for indices that occur more frequently.

16. The storage medium of claim 13, wherein the remap table increases the probability that smaller difference values will occur more frequently.

17. The storage medium of claim 13, wherein the remap table is encoded in the encoded bitstream.

18. The storage medium of claim 13, wherein means (d) causes the computer to:
(1) apply a differencing operation to the remapped values to generate difference signals for the set of signals;
(2) apply statistical encoding to the difference signals to generate variable-length codes for the set of signals; and
(3) generate the encoded bitstream for the set of signals from the variable-length codes.

19. An apparatus for encoding signals, comprising:
a histogram analyzer; and
an encoder, where:
the histogram analyzer generates frequency of occurrence statistics for a set of signals, where each signal is represented by an index;
the histogram analyzer generates a remap table based on the frequency of occurrence statistics of each index, wherein the remap table is generated by assigning the index with the highest frequency of occurrence to a remapped value near the middle of the range of the remapped values and by assigning indices with decreasing frequency of occurrence to the remapped values on either side of the remapped value corresponding to the highest frequency index in an alternating fashion;
the encoder applies the remap table to the indices to map the set of signals into a set of remapped values; and
the encoder generates an encoded bitstream for the set of signals based on the remapped values.

20. The apparatus of claim 19, wherein the signals are video signals and the indices are palette indices.

21. The apparatus of claim 19, wherein the remap table increases the probability that differences between the remapped values will be smaller for indices that occur more frequently.

22. The apparatus of claim 19, wherein the remap table increases the probability that smaller difference values will occur more frequently.

23. The apparatus of claim 19, wherein the remap table is encoded in the encoded bitstream.

24. The apparatus of claim 19, wherein the encoder:
(1) applies a differencing operation to the remapped values to generate difference signals for the set of signals;
(2) applies statistical encoding to the difference signals to generate variable-length codes for the set of signals; and
(3) generates the encoded bitstream for the set of signals from the variable-length codes.

25. A process for decoding encoded signals, comprising the steps of:
(a) receiving an encoded bitstream comprising codes, the codes having been generated based on remapped values, the remapped values having been generated by applying a remap table to an original set of signals, the remap table having been generated abased on frequency of occurrence statistics of the original set of signals, wherein the remap table has been generated by assigning the index with the highest frequency of occurrence to a remapped value near the middle of the range of the remapped values and by assigning indices with decreasing frequency of occurrence to the remapped values on either side of the remapped value corresponding to the highest frequency index in an alternating fashion; and
(b) using the remap table to decode the encoded bitstream.

26. The process of claim 25, wherein the signals are video signals and the indices are palette indices.

27. The process of claim 25, wherein the remap table increases the probability that differences between the remapped values will be smaller for indices that occur more frequently.

28. The process of claim 25, wherein the remap table increases the probability that smaller difference values will occur more frequently.

29. The process of claim 25, wherein the remap table is retrieved from the encoded bitstream.

30. The process of claim 25, wherein:
the encoded bitstream comprises variable-length codes, the variable-length codes having been generated by applying statistical encoding to difference signals, the difference signals having generated by applying a differencing operation to the remapped values; and step
(b) comprises the steps of:
(1) applying statistical decoding to the codes to recover the difference signals;

(2) applying a summing operation to the difference signals to recover the remapped values; and (3) applying the remap table to the remapped values to recover the original set of signals.

31. An apparatus for decoding encoded signals, comprising:

(a) means for receiving an encoded bitstream comprising codes, the codes having been generated based on remapped values, the remapped values having been generated by applying a remap table to an original set of signals, the remap table having been generated based on frequency of occurrence statistics of the original set of signals, wherein the remapped has been generated by assigning the index with the highest frequency of occurrence to a remapped value near the middle of the range of the remapped values and by assigning indices with decreasing frequency of occurrence to the remapped values on either side of the remapped value corresponding to the highest frequency index in an alternating fashion; and (b) means for using the remap table to decode the encoded bitstream.

32. The apparatus of claim 31, wherein the signals are video signals and the indices are palette indices.

33. The apparatus of claim 31, wherein the remap table increases the probability that differences between the remapped values will be smaller for indices that occur more frequently.

34. The apparatus of claim 31, wherein the remap table increases the probability that smaller difference values will occur more frequently.

35. The apparatus of claim 31, wherein the remap table is retrieved from the encoded bitstream.

36. The apparatus of claim 31, wherein:

the encoded bitstream comprises variable-length codes, the variable-length codes having been generated by applying statistical encoding to difference signals, the difference signals having generated by applying a differencing operation to the remapped values; and means (b):

(1) applies statistical decoding to the codes to recover the difference signals;

(2) applies a summing operation to the difference signals to recover the remapped values; and (3) applies the remap table to the remapped values to recover the original set of signals.

37. A storage medium encoded with machine-readable computer program code for decoding encoded signals, comprising:

(a) means for causing the computer to receive an encoded bitstream comprising codes, the codes having been generated based on remapped values, the remapped values having been generated by applying a remap table to an original set of signals, the remap table having been generated based on frequency of occurrence statistics of the original set of signals, wherein the remap table has been generated by assigning the index with the highest frequency of occurrence to a remapped value near the middle of the range of the remapped values and by assigning indices with decreasing frequency of occurrence to the remapped values on either side of the remapped value corresponding to the highest frequency index in a alternating fashion; and (b) means for causing the computer to use the remap table to decode the encoded bitstream.

38. The storage medium of claim 37, wherein the signals are video signals and the indices are palette indices.

39. The storage medium of claim 37, wherein the remap table increases the probability that differences between the remapped values will be smaller for indices that occur more frequently.

40. The storage medium of claim 37, wherein the remap table increases the probability that smaller difference values will occur more frequently.

41. The storage medium of claim 37, wherein the remap table is retrieved from the encoded bitstream.

42. The storage medium of claim 37, wherein:

the encoded bitstream comprises variable-length codes, the variable-length codes having been generated by applying statistical encoding to difference signals, the difference signals having generated by applying a differencing operation to the remapped values; and means (b) causes the computer to:

(1) apply statistical decoding to the codes to recover the difference signals;

(2) apply a summing operation to the difference signals to recover the remapped values; and (3) apply the remap table to the remapped values to recover the original set of signals.

43. An apparatus for decoding encoded signals, comprising:

a receiver; and a decoder, wherein:

the receiver receives an encoded bitstream comprising codes, the codes having been generated based on remapped values, the remapped values having been generated by applying a remap table to an original set of signals, the remap table having been generated based on frequency of occurrence statistics of the original set of signals, wherein the remap table has been generated by assigning the index with the highest frequency of occurrence to a remapped value near the middle of the range of the remapped values and by assigning indices with decreasing frequency of occurrence to the remapped values on either side of the remapped value corresponding to the highest frequency index in an alternating fashion; and (b) the decoder uses the remap table to decode the encoded bitstream.

44. The apparatus of claim 43, wherein the signals are video signals and the indices are palette indices.

45. The apparatus of claim 43, wherein the remap table increases the probability that differences between the remapped values will be smaller for indices that occur more frequently.

46. The apparatus of claim 43, wherein the remap table increases the probability that smaller difference values will occur more frequently.

47. The apparatus of claim 43, wherein the remap table is retrieved from the encoded bitstream.

48. The apparatus of claim 43, wherein:

the encoded bitstream comprises variable-length codes, the variable-length codes having been generated by applying statistical encoding to difference signals, the difference signals having generated by applying a differencing operation to the remapped values; and the decoder:

(1) applies statistical decoding to the codes to recover the difference signals;

(2) applies a summing operation to the difference signals to recover the remapped values; and (3) applies the remap table to the remapped values to recover the original set of signals.

* * * * *